(12) United States Patent
Khawand

(10) Patent No.: US 10,107,639 B2
(45) Date of Patent: Oct. 23, 2018

(54) AUDIO OUTPUT CONFIGURED TO INDICATE A DIRECTION

(75) Inventor: Charbel Khawand, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 748 days.

(21) Appl. No.: 12/560,280

(22) Filed: Sep. 15, 2009

(65) Prior Publication Data

US 2011/0066365 A1    Mar. 17, 2011

(51) Int. Cl.
*G01C 21/00* (2006.01)
*G01C 21/36* (2006.01)

(52) U.S. Cl.
CPC ................... *G01C 21/3629* (2013.01)

(58) Field of Classification Search
CPC ................................................. G01C 21/3629
USPC ......................................................... 701/201
See application file for complete search history.

(56) References Cited

U.S. PATENT DOCUMENTS

| | | | |
|---|---|---|---|
| 6,028,537 A * | 2/2000 | Suman et al. | 340/988 |
| 6,069,585 A | 5/2000 | Lanciaux | |
| 6,401,028 B1 * | 6/2002 | Kamiya | G01C 21/36 340/990 |
| 7,130,759 B2 * | 10/2006 | Willins et al. | 702/150 |
| 2003/0020638 A1 * | 1/2003 | Sari et al. | 340/995 |
| 2003/0054830 A1 * | 3/2003 | Williams | G01C 21/20 455/456.1 |
| 2003/0061001 A1 * | 3/2003 | Willins et al. | 702/153 |
| 2003/0095668 A1 | 5/2003 | Wilcock et al. | |
| 2005/0114024 A1 | 5/2005 | Benham et al. | |
| 2007/0077940 A1 | 4/2007 | Mamo | |
| 2009/0097359 A1 | 4/2009 | Haque et al. | |
| 2009/0287401 A1 * | 11/2009 | Levine | G01C 21/3492 701/117 |

FOREIGN PATENT DOCUMENTS

| | | |
|---|---|---|
| WO | 9702469 A1 | 1/1997 |
| WO | 2004011107 A1 | 2/2004 |

OTHER PUBLICATIONS

Tonnis, et al., "Effective Control of a Car Driver's Attention for Visual and Acoustic Guidance towards the Direction of Imminent Dangers", retrieved at «http://ieeexplore.ieee.org/stamp/stamp.jsp?tp=&arnumber=4079251&isnumber=4079239», IEEE, 2006, pp. 13-22.

* cited by examiner

*Primary Examiner* — Maceeh Anwari

(57) ABSTRACT

An audio output that is configured to indicate a direction is described. In an implementation, a direction of a target is determined in relation to a computing device. An output of sound is configured by the computing device to indicate the direction of the target in relation to the computing device.

17 Claims, 5 Drawing Sheets

AUDIO OUTPUT CONFIGURED TO INDICATE A DIRECTION

BACKGROUND

Users of computing device may encounter a variety of situations that may limit the user's interaction with the device. For example, the computing device may be located in a vehicle and include global positioning system functionality. Using this functionality, the user may receive turn-by-turn instructions to a final destination. However, use of this functionality may be limited due to a variety of other tasks that are also performed by the user.

For example, the user may input the final destination into the computing device. The computing device may then compute a route to be taken from a current position of the computing device to the final destination. The computing device may then use the route to instruct the user "where to turn," such as by using arrows that are output on a display device of the computing device.

However, the user may encounter a variety of distracting situations while traveling along the route, such as other vehicles, road hazards, complicated interchanges, and so on. Therefore, the user may find it difficult to quickly view and comprehend the directions given by the computing device in such situations. For instance, it may be difficult for the user to look at the display device to see the instructions during complicated portions of the route, e.g., multiple lane changes with quick turns. Consequently, the user may become frustrated while traveling along this route and thus form a negative opinion of the functionality of the device as a whole.

SUMMARY

An audio output that is configured to indicate a direction is described. In an implementation, a direction of a target is determined in relation to a computing device. An output of sound is configured by the computing device to indicate the direction of the target in relation to the computing device.

In an implementation, one or more computer-readable storage media include instructions that are executable by a computing device to configure an output of sound to indicate a direction and distance of a target in relation to the computing device, the direction is computed using a location of the target and a location of the computing device.

In an implementation, a mobile communications device includes one or more modules that are configured to determine a location and an orientation of the mobile communications device and receive data that describes a location of another mobile communications device. The one or more modules configure an output of sound to indicate a direction of another mobile communications device in relation to the mobile communications device. The direction is computed by the mobile communications device using the described location of the other mobile communications device, the determined location data of the mobile communications device, and an orientation of the mobile communications device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

In some instances, interaction with a computing device may distract a user from an intended task, such as interacting with a GPS device while driving a vehicle. In other instances, a variety of situations may be encountered that distract a user from interacting with the computing device, e.g., various people that surround the user when talking on a mobile phone. Thus, in each of these instances it may be difficult for the user to engage in focused interaction with the device.

An audio output is described that is configured to indicate a direction. In an implementation, a direction is determined between a computing device and a target. An output of sound by the computing device is then configured to indicate the direction such that the user of the computing device may gain positional awareness of the target in relation to the user without having to view the computing device, e.g., the display device of the computing device. In this way, a user may concentrate on the task at hand (e.g., driving a vehicle) and may be made aware of "where to go" without having to look at the computing device. A variety of different techniques may be employed to configure the audio output to indicate the direction, further discussion of which may be found in relation to the following sections.

In the following discussion, a variety of example implementations of a computing device (e.g., a global positioning system device, a mobile communications device such as a wireless phone, and so on) are described. Additionally, a variety of different functionality that may be employed by the computing device is described for each example, which may be implemented in that example as well as in other described examples. Accordingly, example implementations are illustrated of a few of a variety of contemplated implementations which include personal digital assistants, mobile music players, dedicated messaging devices, portable game devices, game consoles, netbooks, and so on.

Example Implementations

Figure 1:
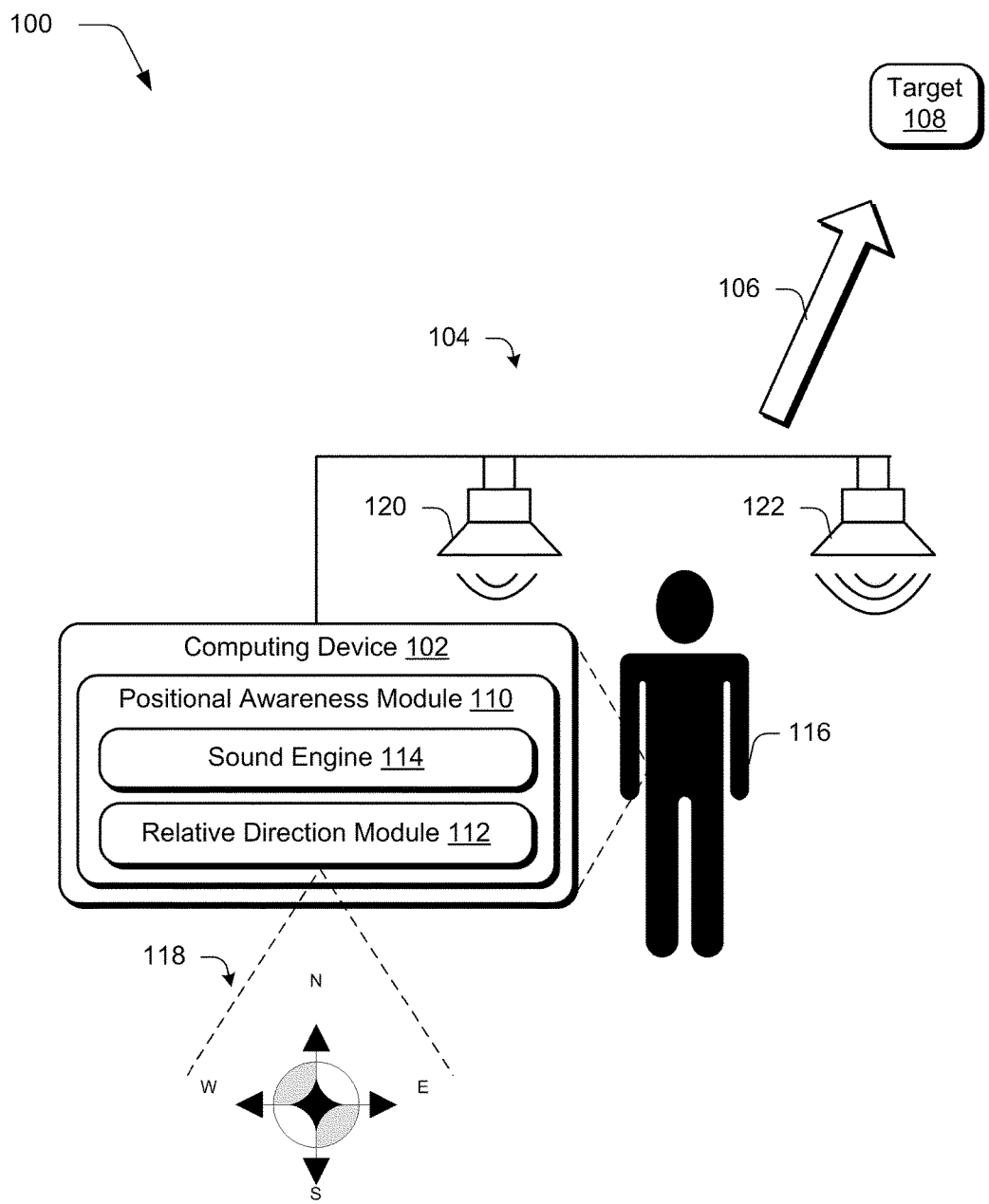
FIG. 1 is an illustration of an example implementation of an environment that is configured to implement techniques to configure an audio output to indicate a direction.

FIG. 1 is an illustration of an environment 100 in an example implementation in which a computing device 102 configures an audio output 104 to indicate a direction 106 of a target 108. The computing device 102 is illustrated as including a positional awareness module 110 that is representative of functionality to indicate a direction of the target using sound.

The positional awareness module 110 as illustrated includes a relative direction module 112 and a sound engine 114. The relative direction module 112 is representative of functionality of the computing device 102 to determine the direction 106 of the target 108 in relation to the computing device 102, which may coincide with a position at which a user 116 of the computing device 102 is likely positioned.

The relative direction module 112 may determine the direction 106 of the target 108 in a variety of ways. For example, the relative direction module 112 may incorporate functionality of a compass 118 to determine an orientation of the computing device 102, which may be performed in two dimensions (e.g., 360 degrees) or three dimensions. Additionally, the determination may be made for a peripheral device that may be considered a part of the computing device 102. For example, a user of the computing device may include a wearable device (e.g., a headset) that is in communication with a portion of the computing device 102 having the processor, display, and so on. The wearable device may include functionality to determine an orientation of the wearable device (e.g., a 3D compass) and thus a likely direction in which a user of the computing device 102 is oriented, e.g., which way the user is "looking." Thus, the orientation in relation to the computing device 102 may be in relation to a "main" housing of the computing device 102, a peripheral device in communication with the main housing (e.g., a wearable device), and so on.

The relative direction module 112 may then use the orientation along with a position of the computing device 102 and a position of the target 106 to determine the direction 106 with respect to the device, e.g., the orientation of the device in two dimensional and/or three dimensional space. The positions of the computing device 102 and the target 108 may be determined in a variety of ways, such as by the computing device 102 itself as further described in relation to FIG. 2 and/or the computing device 102 and the target 108 as further described in relation to FIG. 3.

The direction 106 that is determined by the relative direction module 112 may then be used by the sound engine 114 to configure the audio output 104 to indicate the direction 106. The audio output 104 may be configured in a variety of ways. For example, a plurality of audio output devices (e.g., speakers) may be used to indicate directionality, e.g., by using the audio device 122 that corresponds with the direction 106, using sound imaging techniques, and so on. Further discussion of use of a plurality of audio devices may be found in relation to FIG. 2. In another example, a single audio device may be used to indicate the direction (e.g., using directional sound, two-dimensional sound interactions, three-dimensional sound interactions, and so on), further discussion of which may be found in relation to FIG. 3.

Generally, the blocks may be representative of modules that are configured to provide represented functionality. Further, any of the functions described herein can be implemented using software, firmware (e.g., fixed logic circuitry), manual processing, or a combination of these implementations. The terms "module," "functionality," and "engine" as used herein generally represent software, firmware, hardware or a combination thereof. In the case of a software implementation, the module, functionality, or logic represents program code that performs specified tasks when executed on a processor (e.g., CPU or CPUs). The program code can be stored in one or more computer readable memory devices. The features of the techniques described above are platform-independent, meaning that the techniques may be implemented on a variety of commercial computing platforms having a variety of processors.

Figure 2:
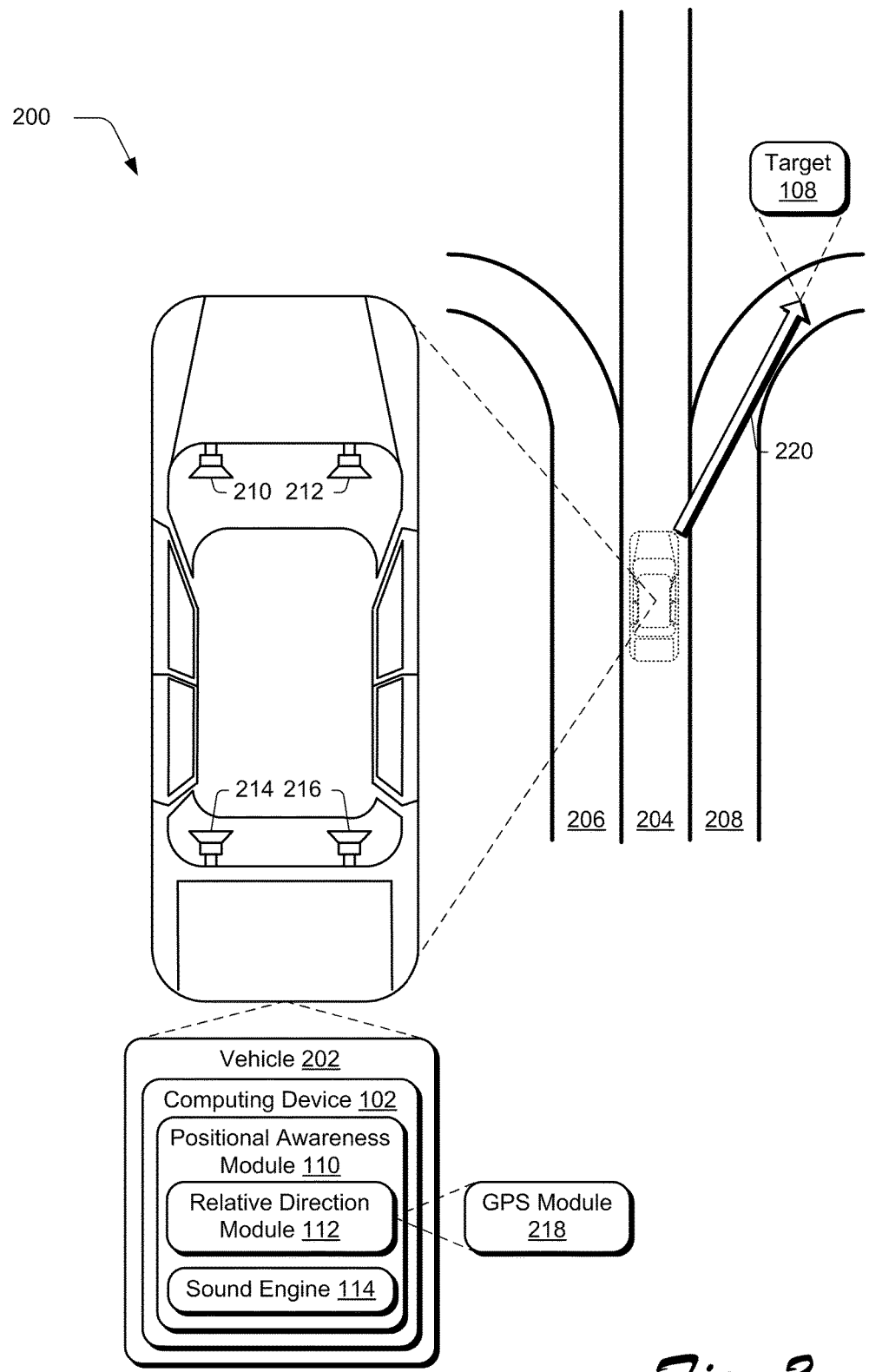
FIG. 2 is illustration of another example implementation of an environment that is configured to implement techniques to configure an audio output to indicate a direction in a vehicle.

FIG. 2 depicts a system 200 in an example implementation in which the computing device 102 is configured to include global positioning system (GPS) functionality to determine a location of a target and the computing device 102. The computing device 102 is illustrated as included in a vehicle 202 that is positioned in a center lane 204 of a three-lane highway that also includes left and right lanes 206, 208. The vehicle 202 is also illustrated as enlarged next to the highway to show audio output devices (speakers) of the vehicle, which include a front-left speaker 210, a front-right speaker 212, a back-left speaker 214 and a back-right speaker 216.

The computing device 102, and more particularly the relative direction module 112 of the positional awareness module 214, is also illustrated as including a GPS module 218. The GPS module 218 represents functionality of the computing device 102 to use position-determining functionality (e.g., GPS) to determine a location of the computing device 102, and consequently the vehicle 202. The GPS module 218 may also represent functionality to determine a location of a destination.

To use the GPS functionality, a user may input an intended destination. In response to the input, the GPS module 218 may compute a route from a current position of the computing device 102 (and thus the vehicle 202) to the destination, which may include a series of sequential waypoints. This series of waypoints may then be used by the positional awareness module 214 as a series of targets to configure an audio output by the sound engine 114.

As shown in FIG. 2, for example, the vehicle 202 is illustrated as positioned in a center lane 204 and the target 108 is illustrated as a waypoint positioned on an off ramp that is accessible via the right lane 208. Thus, the GPS module 218 has already determined a position of the target 108 and may also be used to determine a position of the computing device 102, and therefore the vehicle 202.

The GPS module 218 in this example may also be used to determine the direction of the target 108 in relation to the computing device 102. For instance, the GPS module 218 may determine a heading of the vehicle 202, e.g., a direction of travel. Therefore, the direction 220 of the target 108 in relation to the vehicle 202 may be determined using the position of the target 108, the position of the computing device 102, and the orientation of the computing device 102 (e.g., which is the heading in this instance of the vehicle 202). In other words, the direction 220 may indicate "where to look" to find the target 108 in relation to the vehicle 202.

The sound engine 114 may then configure the audio output (e.g., audio turn-by-turn instructions) based on the direction 220. For example, the computing device 102 may be communicatively coupled to the front-left speaker 210, front-right speaker 212, back-left speaker 214 and back-right speaker 216 as previously described. Thus, the speakers 210-216 are positioned directionally around the user. This directional placement may be leveraged by the sound engine 114 to indicate the direction 220 by weighting the audio output to be greatest from the audio output device that is closest to the direction 108 (e.g., the front-right speaker 212 in this example) and to decrease as the audio output devices get further away from the direction 220, e.g., the back-left speaker 214 in this example would have the least amount of output in this example. Thus, a plurality of audio output devices may be used to indicate the direction 220.

Although weighting of the audio output (e.g., volume) has been described, it should be readily apparent that a wide variety of audio imaging techniques may be deployed without departing from the spirit and scope thereof, such as acoustic wave interference techniques, directional sound projection, and so on. Another example is discussed in relation to the following figure.

Figure 3:
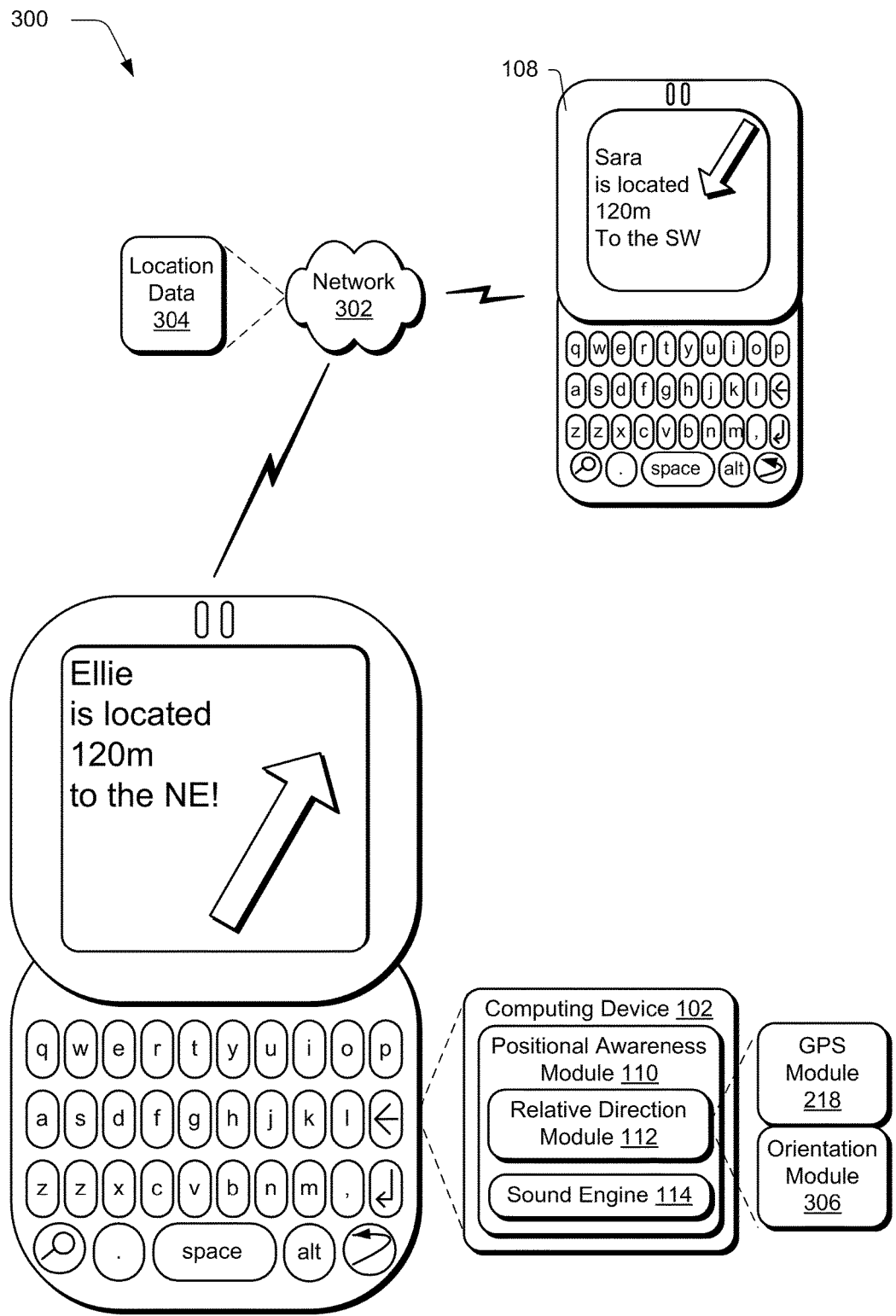
FIG. 3 is an illustration of yet another example implementation of an environment that is configured to implement techniques to configure an audio output to indicate a direction as used by mobile communications devices.

FIG. 3 depicts a system 300 in an example implementation in which the computing device 102 is configured to receive data that describes a location of the target 108 over a network 302. In this example, the computing device 102 is configured as a mobile communications device, e.g., a wireless phone, game console, netbook, messaging device, and so on. The target 108 is also configured as a mobile communications device in this example that is communicatively coupled to the computing device 102 over the network 302, e.g., a cellular network, wireless WAN, wireless LAN, and so on. The computing device 102 also includes a GPS module 218 to determine a location of the computing device 102 using position determining functionality as previously described in relation to FIG. 2.

In this example, however, the computing device 102 receives location data 304 via the network 302 that describes the location of the target 108. For example, the target 108 may also include a GPS module 218 that is executable to determine coordinates of the target 108. This coordinates may then be included in the location data 304 that is communicated over the network 302 to the computing device 102. The computing device 102 may then use the data in determining the direction of the target 108 in relation to the computing device 102.

A relative direction module 112 may also leverage an orientation module 306 to determine the direction. For example, the orientation module 306 may use one or more sensors (e.g., accelerometers, gravity-sensing devices, and so on) to determine the orientation of the device 102 in two dimensional and/or three dimensional space. Using the determined orientation in combination with the positions of the target 108 and the computing device 102, the positional awareness module 110 may compute "where" the target 108 is located in relation to the computing device 102, e.g., the direction and a distance between the devices in this example.

As before, the sound engine 114 may then configure the audio output to indicate the direction. For instance, an audio output may be increased when a user is likely to be "looking" in the direction of the target 108. Continuing with the previous example, because the orientation of the computing device 102 is known, a likely position of the user that is interacting with the device may be inferred from this knowledge. Therefore, the audio output may be configured to indicate the direction of the target 108 when it is determined that the user is likely "pointed in that direction" based on an orientation of the computing device 102.

For example, the likely orientation of the user may be determined by taking into account a variety of different orientations of the computing device 102 and/or current functionality of the computing device 102 that is being utilized. Once such orientation includes holding the computing device 102 against a user's ear, such as to place telephone call. Therefore, the likely orientation of the user may be determined by the orientation of the computing device 102 in space and functionality employed by the computing device 102, e.g., telephone functionality in this example. Likewise, another likely position of the user may be determined based on a horizontal orientation of the computing device 122, e.g., when held horizontally in the user's hand to view a display device of the computing device 102, such as to interact with a user interface displayed on a display device. Thus, in this implementation that positional awareness module 110 may take into account the likely orientation of the user of the computing device 102 to indicate the direction of the target 108.

The positional awareness module 110 may also indicate a distance between the target 108 and the computing device 102. The distance may be indicated in a variety of ways, such as configuration of the audio output (e.g., using volume), displayed on the user interface on the display device of the computing device 102 as illustrated in FIG. 3, and so on. Thus, the direction and distance functionality may be used wide variety of purposes, such as to enable telephone callers to locate each other in a building (e.g., a shopping mall), to enable a user to locate the vehicle 202 of FIG. 2 in parking lot, and so on.

Example Procedures

The following discussion describes audio output configuration techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to the environments 100-300 of FIGS. 1-3, respectively.

Figure 4:
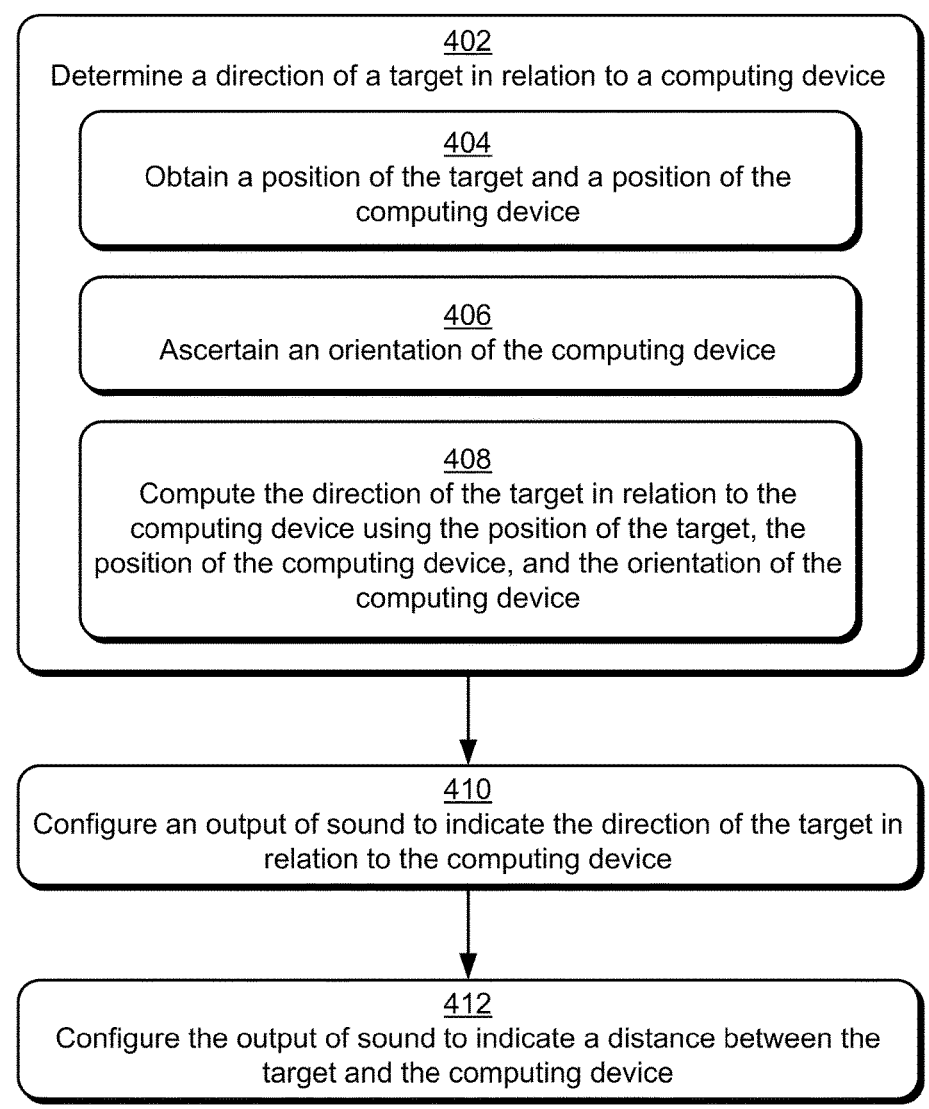
FIG. 4 is a flow diagram depicting a procedure in an example implementation in which an audio output is configured to indicate a direction and a distance to a target.

FIG. 4 depicts a procedure 400 in an example implementation in which a direction of a target in relation to a computing device is indicated using an audio output. A direction of a target is determined in relation to a computing device (block 402). For example, a position of the target an acquisition of the computing device may be obtained (block 404), such as through position determining functionality including a global positioning system, use of broadcast towers (e.g., cellular towers), and so on.

An orientation of the computing device is ascertained (block 406), such as through use of sensors of the computing device to determine the orientation in two and/or three dimensions. The direction of the target is then computed in relation to the computing device using the position of the target, the position of the computing device, and the orientation of the computing device (block 408). The output of sound may then be configured to indicate of the direction of the target in relation to the computing device (block 410) and indicate the distance between the target and the computing device (block 412).

In this way, the audio output techniques described herein may minimize the visual and voice distractions of the users by supplementing them with sound interactions. For example, the computing device may provide "3D sound points" to the user through a 360 degree auditory space to indicate a relative location of the target 108. The sound effects (along with volume gain to stress distance to target) may provide the user with an artificial effect through 3D head transfer algorithms. For example, the auditory effect may be used to indicate that a voice note (e.g., instructions) that appears to be biased toward a left ear indicates that the target 108 is to the left and vice versa. Thus, in an implementation the sound engine 114 may be used to provide a 360 degree auditory positioning system. In this way, the user is aided to quickly locate a target using natural responses initiated by the techniques described herein.

Example Device

Figure 5:
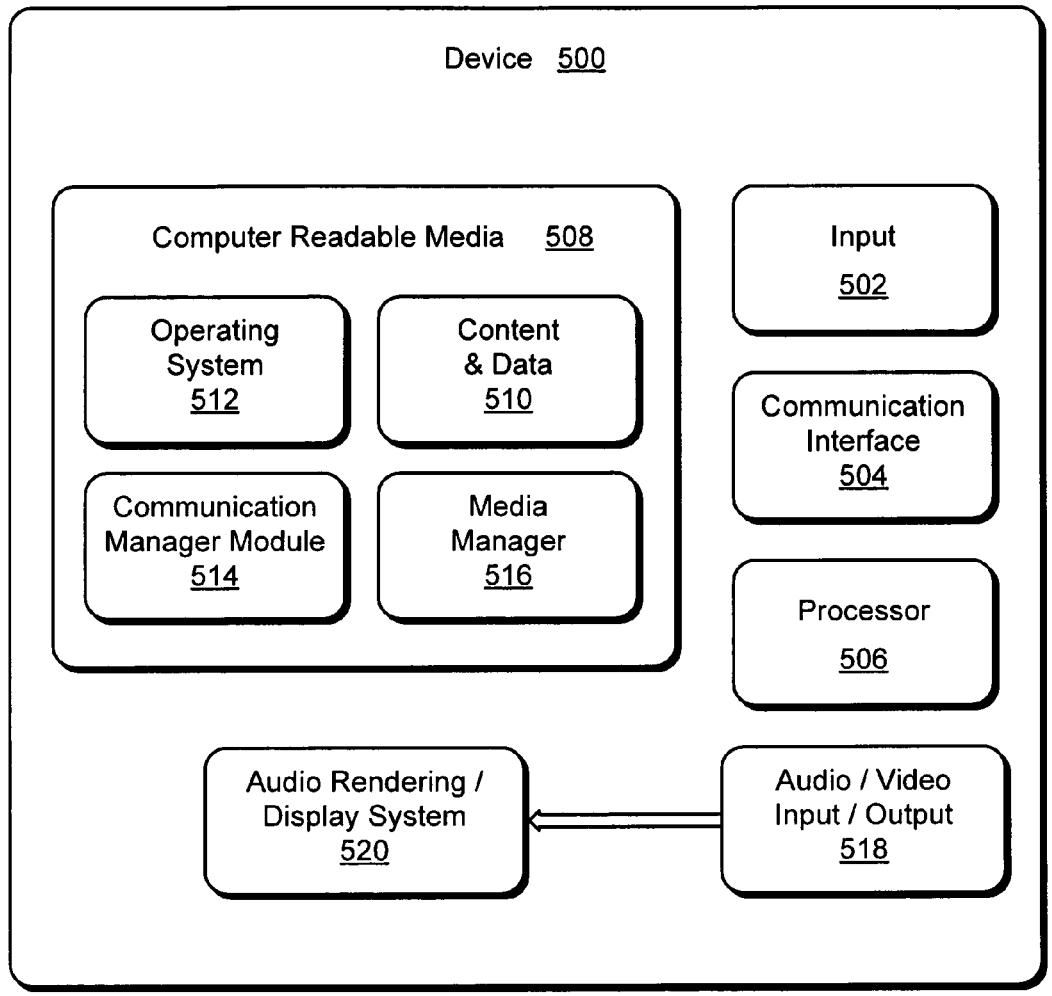
FIG. 5 illustrates various components of an example device that can be implemented in various embodiments as any type of a mobile device to implement embodiments of devices, features, and systems for mobile communications.

FIG. 5 illustrates various components of an example device 500 that can be implemented in various embodiments as any type of a mobile device to implement embodiments of devices, features, and systems for mobile communications. For example, device 500 can be implemented as any of the mobile communications devices 102 described with reference to respective FIGS. 1-3. Device 500 can also be implemented to access a network-based service.

Device 500 includes input 502 that may include Internet Protocol (IP) inputs as well as other input devices, such as the keyboard 112 of FIG. 1. Device 500 further includes communication interface 504 that can be implemented as any one or more of a wireless interface, any type of network interface, and as any other type of communication interface. A network interface provides a connection between device 500 and a communication network by which other electronic and computing devices can communicate data with device 500. A wireless interface enables device 500 to operate as a mobile device for wireless communications.

Device 500 also includes one or more processors 506 (e.g., any of microprocessors, controllers, and the like) which process various computer-executable instructions to control the operation of device 500 and to communicate with other electronic devices. Device 500 can be implemented with computer-readable media 508, such as one or more memory components, examples of which include random access memory (RAM) and non-volatile memory (e.g., any one or more of a read-only memory (ROM), flash memory, EPROM, EEPROM, etc.).

Computer-readable media 508 provides data storage to store content and data 510, as well as device applications and any other types of information and/or data related to operational aspects of device 500. For example, an operating system 512 can be maintained as a computer application with the computer-readable media 508 and executed on processor 506. Device applications can also include a communication manager module 514 (which may be used to provide telephonic functionality) and a media manager 516.

Device 500 also includes an audio and/or video output 518 that provides audio and/or video data to an audio rendering and/or display system 520. The audio rendering and/or display system 520 can be implemented as integrated component(s) of the example device 500, and can include any components that process, display, and/or otherwise render audio, video, and image data. Device 500 can also be implemented to provide a user tactile feedback, such as vibrate and haptics.

Generally, the blocks may be representative of modules that are configured to provide represented functionality. Further, any of the functions described herein can be implemented using software, firmware (e.g., fixed logic circuitry), manual processing, or a combination of these implementations. The terms "module," "functionality," and "logic" as used herein generally represent software, firmware, hardware or a combination thereof. In the case of a software implementation, the module, functionality, or logic represents program code that performs specified tasks when executed on a processor (e.g., CPU or CPUs). The program code can be stored in one or more computer readable memory devices. The features of the techniques described above are platform-independent, meaning that the techniques may be implemented on a variety of commercial computing platforms having a variety of processors.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A mobile device, comprising:
    a communication interface configured to:
        receive location data, via a network, for a target, and
        communicate with a peripheral device attached to a user, separate from the mobile device, having functionality to determine an orientation of the peripheral device;
    a global positioning system module configured to determine a current position of the mobile device;
    an audio rendering system configured to instruct the user of a route to the target; and
    a processor configured to execute a positional awareness module having:
        an orientation module configured to ascertain, from the orientation of the peripheral device attached to the user, an orientation of the user,
        a relative direction module to compute a direction of the target in relation to the mobile device using the location data for the target, the current position of the mobile device, and the orientation of the user, and
        a sound engine to configure an audio imaging of an audio output from the audio rendering system to indicate the direction of the target in relation to the user, wherein the audio imaging comprises at least one of weighting of the audio output, acoustic wave interference techniques, or directional sound projection.

2. The mobile device as described in claim 1, wherein the location data includes global positioning system (GPS) coordinates of the target.

3. The mobile device as described in claim 1, wherein the mobile device is moving.

4. The mobile device as described in claim 1, wherein the audio rendering system is positioned directionally around the user.

5. The mobile device as described in claim 1, wherein the audio rendering system is configured to adjust a volume of the audio output to indicate the direction of the target in relation to the mobile device.

6. The mobile device as described in claim 1, wherein the audio output is configured to indicate a relative distance from the target.

7. A computing device having a memory configured to store instructions that when performed by the computing device execute a positional awareness module, the computing device further configured to:
    communicate with a peripheral device attached to a user, separate from the computing device, having functionality to determine an orientation of the peripheral device;
    receive location data for a target, wherein the target is a mobile communication device, the location data describing a location of the mobile communication device as determined by the mobile communication device;
    instruct the user of a route to the target;
    ascertain an orientation of the user from the orientation of the peripheral device attached to the user;
    compute the direction of the target in relation to the computing device using the location data for the target, a current position of the computing device, and the orientation of the user; and configure an audio imaging of an audio output to indicate the direction of the target in relation to the user, wherein the audio imaging comprises at least one of weighting of the audio output, acoustic wave interference techniques, or directional sound projection.

8. The computing device as described in claim 7, the computing device further configured to:
determine a current position of the computing device using global positioning system (GPS) functionality of the computing device.

9. The computing device as described in claim 7, the computing device further configured to:
adjust a volume of the audio output to indicate the direction of the target in relation to the mobile device.

10. The computing device as described in claim 7, the computing device further configured to:
indicate a relative distance from the target.

11. A method implemented by a mobile communication device, the method comprising:
communicating with a peripheral device attached to a user, separate from the mobile communication device, having functionality to determine an orientation of the peripheral device;
receiving location data for a target, wherein the target is a mobile device, the location data describing a location of the mobile device as determined by the mobile device;
instructing the user of a route to the target;
ascertaining an orientation of the user from the orientation of the peripheral device attached to the user;
computing a direction of the target in relation to the mobile communication device using the location data for the target, a current position of the computing device, and the orientation of the user; and
configuring an audio imaging of an audio output to indicate the direction of the target in relation to the user, wherein the audio imaging comprises at least one of weighting of the audio output, acoustic wave interference techniques, or directional sound projection.

12. The method as described in claim 11, further comprising:
adjusting a volume of the audio output and configuring the audio imaging of the audio output from an audio rendering system to indicate the direction of the target in relation to the mobile communication device by weighting the audio output to be greatest from an audio output device, among a plurality of audio output devices available to the audio rendering system, that is closest to the direction of the target.

13. The method as described in claim 11, further comprising:
determining a current position of the mobile device using a global positioning module.

14. The method as described in claim 11, wherein the location data includes global positioning system (GPS) coordinates of the target.

15. The method as described in claim 11, wherein the mobile communication device is moving.

16. The method as described in claim 11, wherein the audio rendering system is positioned directionally around the user.

17. The method as described in claim 11, wherein the audio rendering system is configured to indicate a relative distance from the target.

* * * * *